United States Patent Office 3,661,774
Patented May 9, 1972

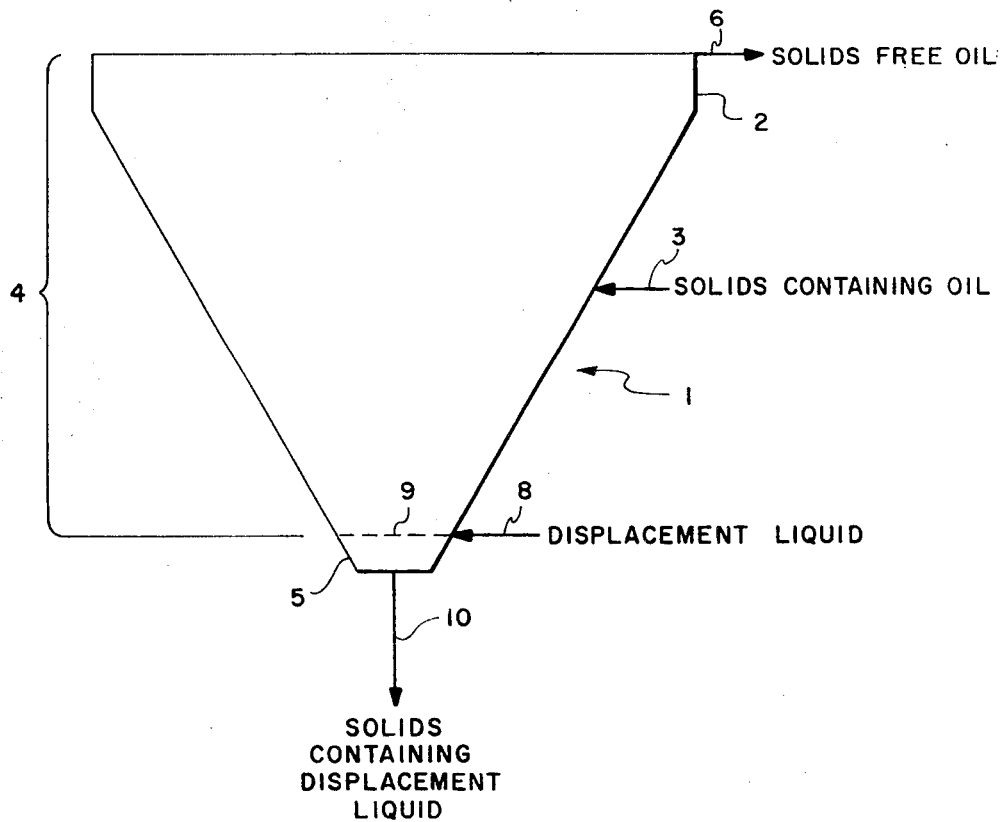

3,661,774
SEPARATION OF SOLIDS FROM A LIQUID
George P. Masologites, Park Forest, Ill., assignor to Atlantic Richfield Company, New York, N.Y.
Filed Oct. 28, 1970, Ser. No. 84,756
Int. Cl. B01d 12/00
U.S. Cl. 210—21
13 Claims

ABSTRACT OF THE DISCLOSURE

A method for separating solid particles from a liquid in which they are dispersed wherein the liquid is subjected to force conditions such as gravity settling, centrifugation, and the like to cause the solid particles to collect in a localized portion thereof, and introducing a displacement liquid into the localized portion under conditions such that the displacement liquid takes the place of at least part of the solids containing liquid in that localized portion, the displacement liquid taking up solid particles migrating into the localized portion, and removing displacement liquid having solid particles dispersed therein.

BACKGROUND OF THE INVENTION

Oftentimes in the preparation or formation of liquid materials the liquid material obtained has dispersed therein solid particles whose presence renders the liquid of lower quality and therefore of lower economic value than if the liquid were free of such solid particles.

A particularly notable situation is that wherein normally solid coal is liquefied such as by hydrogenation in an ebullated bed as is fully and completely disclosed in U.S. Pat. Re. 25,770, the disclosure of which is incorporated herein by reference. In the liquefaction of normally solid coal, a liquid hydrocarbonaceous product is obtained which is of exceedingly complex chemical nature but from which various desirable hydrocarbonaceous products can be obtained by conventional processes such as distillation, these products including naphtha, light distillate, heavy distillate, and residual fuel oil.

However, the hydrocarbonaceous liquid product as obtained from the coal liquefaction reactor normally has intimately dispersed therein a substantial amount of solid particles of various origins, e.g., hydrogenation catalyst particles, ash, coke, char, inert contact particles, and the like. These particles, besides being dispersed throughout the entire hydrocarbonaceous liquid product are often of quite small size, e.g., from $\frac{1}{16}$ inch down to about 1 micron in diameter or largest cross-sectional dimension, and are very difficult to remove from the liquid. When these particles are removed from the liquid, because of the difficulty of removal, a substantial amount of the liquid is removed with the particles and this liquid is lost from the processes which produce the naphtha, distillates, and the like. This liquid is normally used up in processes which produce less desirable products such as coke.

Therefore, it is very desirable from both a processing and an economic point of view to separate these particles from the liquid hydrocarbonaceous product in a manner which minimizes to the greatest extent the amount of liquid product removed with the solid particles thereby maximizing the amount of liquid product that is left for further processing into naphtha, and the like and minimizing the amount of material left for coking and the like.

The above background applies equally as well to the processing of oil shale, tar, tar sands, pitch, and the like to useful liquid hydrocarbonaceous products.

SUMMARY OF THE INVENTION

According to this invention there is provided a method for separating solid particles from a hydrocarbonaceous liquid by subjecting the solids containing liquid to force conditions which cause the solid particles therein to collect in a localized portion thereof, introducing into that localized portion a displacement liquid which is substantially inert to the solids containing liquid and which has a specific gravity substantially greater than the solids containing liquid so that the displacement liquid takes the place of (displaces) at least part of the solids containing liquid in the localized portion and takes up (has dispersed therein) solid particles that are migrating into the localized portion.

In effect therefore, these particles, when moving under the force conditions imposed thereon, move into the localized portion of the solids containing liquid and in that portion are transferred from the solids containing liquid to the displacement liquid. The displacement liquid, with solid particles dispersed therein is removed from the localized portion of the solids containing liquid.

There is separately removed a substantially solids free hydrocarbonaceous liquid, this liquid being of a higher quality since it is substantially solids free and also being amenable to further processing to desired hydrocarbonaceous products such as naphtha and the like.

The solids containing displacement liquid can be processed for removal of the displacement liquid for reuse in the process of this invention or other disposal as desired, thereby leaving substantially only the solid particles for disposal as waste, for coking, and the like.

By following the process of this invention the amount of liquid initially present in the solids containing liquid hydrocarbonaceous product which is made available for processing into naphtha, and the like is maximized because substantially only the solids are removed therefrom because of the use of the displacement liquid medium. Additionally, the particular displacement liquid employed can be chosen to be more easily removed from the solid particles by distillation, solvent extraction, filtering, centrifugation, and the like so that substantially all of the displacement liquid can be recovered for reuse.

Accordingly, it is an object of this invention to provide a new and improved method for removing solid particles from a hydrocarbonaceous liquid. It is another object to provide a new and improved method for upgrading liquid hydrocarbonaceous products obtained from coal, oil shale, tar, tar sands, pitch, and the like. It is another object to provide a new and improved method for improving the quality of hydrocarbonaceous liquids by the separation of solid particles therefrom with minimum loss of the hydrocarbonaceous liquid.

Other aspects, objects, and advantages of this invention will be apparent to those skilled in the art from this disclosure and the appended claims.

DETAILED DESCRIPTION OF THE INVENTION

The drawing shows one embodiment of apparatus that can be employed in carrying out the process of this invention.

More specifically the drawing shows a frustoconical chamber 1 having a right cylindrical top portion 2.

A solids containing liquid hydrocarbonaceous product is introduced into an intermediate portion of chamber 1 by way of pipe 3. The liquid introduced by pipe 3 is introduced at a sufficiently slow rate to establish and maintain a substantially quiescent pool 4 of liquid. In pool 4 the particles in the liquid from pipe 3 are subjected to the force of gravity under conditions which allow the particles to freely migrate downwardly towards a bottom portion 5 of chamber 1. Thus, the upper portion of chamber 1, particularly cylindrical portion 2, contains liquid from pipe 3 which is substantially free of solids and which can be drawn off by way of pipe 6, preferably at a rate substantially the same as the rate of introduction of liquid from pipe 3.

The substantially solids free hydrocarbonaceous liquid withdrawn by way of pipe 6 is a higher quality liquid because of the substantial absence of solid particles therein and can be further processed to produce naphtha and the like.

Bottom portion 5 of chamber 1 is a localized portion wherein the solid particles collect.

A displacement liquid is introduced into this localized portion by way of pipe 8, the displacement liquid being substantially inert, i.e., nonreactive, to the hydrocarbonaceous liquid introduced by way of pipe 3. This liquid has a specific gravity which is greater, e.g., at least 0.05 specific gravity units greater and preferably 0.10 specific gravity units greater than the specific gravity of the hydrocarbonaceous liquid introduced by way of pipe 3. The displacement liquid is introduced by way of pipe 8 at a flow rate such that substantial mixing of the displacement liquid and the liquid from pipe 3 is avoided and an interface 9 is achieved between the displacement liquid and the liquid from pipe 3. Thus, the displacement liquid is introduced so as not to distrub the quiescence of pool 4 and to establish a localized portion wherein solid particles migrating downwardly under the force of gravity move from the liquid of pipe 3 across interface 9 into the displacement liquid.

Solids containing displacement liquid is removed from the bottom of chamber 1 by way of pipe 10 for further processing such as flashing of displacement liquid from the solids thereby leaving the solids for coking, or other disposal as desired. The solids containing displacement liquid removed by way of pipe 10 is preferably removed at a rate substantially the same as the rate of introduction of displacement liquid by way of pipe 8 thereby setting up a dynamic equilibrium between the displacement liquid and localized portion 5 in the quiescent pool 4. Under these force conditions solids containing particles continually migrate from pool 4 into the displacement liquid in localized portion 5 while substantially solids free liquid from pipe 3 is continually removed by way of pipe 6. All removal and addition of materials from and to chamber 1 are accomplished so that substantial hindrance of the gravity flow of solid particles downwardly into localized portion 5 is avoided.

Other known apparatus can be employed to accomplish the transfer of solid particles from the liquid of pipe 3 to the displacement liquid of pipe 8. For example, instead of employing only gravity force conditions, other force conditions can be imposed in addition to or in lieu of gravity, e.g., centrifugal force, electrical force, magnetic force, and the like can all be employed alone or in any desired combination to give the solid particles from pipe 3 vectorial movement with a measurable velocity towards a localized or collecting portion of chamber 1 so that the particles, shortly after injection into chamber 1 will move towards this localized portion and under the momentum of this movement will transfer themselves from the liquid of pipe 3 across interface 9 and into the displacement liquid.

The displacement liquid is maintained in contact with the liquid from pipe 3 for a time sufficient for substantial amounts of solid particles to migrate from the liquid of pipe 3 into the displacement liquid under the prevailing force conditions.

From the above it can be seen that the particular force conditions applied to a given situation can vary widely depending upon the particular chemical and physical nature of the liquid in pipe 3 and the displacement liquid, the conditions of temperature and pressure imposed on the contents of chamber 1, the interfacial forces between the liquid of pipe 3 and the displacement liquid, the desired rate of separation of solids from the liquid in pipe 3, the desired rate of recovery of substantially solids free liquid by way of pipe 6, the size, physical configuration and chemical nature of the solid particles in the liquid in pipe 3, and the like. However, the requirements of imparting to the solid particles a velocity in a desired direction, the velocity being sufficient to transfer this particles to the displacement liquid, and the displacement liquid being substantially inert as to the solids containing liquid and of a substantially greater specific gravity than the solids containing liquid apply under all conditions of operation.

Generally, the solids containing liquid will be a hydrocarbonaceous liquid, particularly one derived from at least one of oil shale, coal, tar, tar sands, and pitch. The liquid will generally contain hydrocarbonaceous materials ranging from butane to those boiling at a temperature of about 1500° F. and will contain at least one of naphtha having materials varying from the boiling point of butane to 400° F., light distillate having a boiling range from about 400 to about 650° F., heavy distillate having a boiling range from about 650 to 975° F., residual fuel oil having a boiling range starting at about 975° F. and extending up to about 1500° F.

This liquid contains solid particles which, depending upon the origin of the liquid itself, can range from unconverted coal, unconverted shale, hydrogenation catalyst particles, ash, coke, char, and the like to earth particles and rock particles. The particles can range in diameter or largest cross-sectional dimension from $\frac{1}{16}$ inch down to about 1 micron and can be present in the liquid from about 0.1 up to about 50 weight percent based on the total weight of the liquid.

The displacement liquid can be an aqueous liquid or a hydrocarbonaceous liquid so long as an interface can be maintained between the solids containing hydrocarbonaceous liquid and the displacement liquid. Maintenance of a definitely ascertainable interface between the two liquids can be achieved by the displacement liquid having a specific gravity substantially greater than the solids containing liquid. This is particularly true with apparatus such as that shown in the drawing wherein the displacement liquid is desirably maintained in a position under all or part of the solids containing liquid.

The displacement liquid can be water or water having inorganic salts or other materials dissolved or suspended therein to alter the specific gravity thereof to meet the requirements of the process of this invention, all of which, for the purposes of this invention, are included within the term "aqueous." For example, water can have alkali metal salts of halides, sulfates, carbonates, nitrates, and the like dissolved therein and/or alkaline earth metal salts of similar cations dissolved or dispersed therein depending upon their solubility. Also other weighting materials such as barrite, and the like can be dispersed therein to alter the specific gravity of the resulting aqueous material so long as the dispersed solids do not interfere substantially with the displacement liquid taking in the solid particles.

The displacement liquid can also be a hydrocarbonaceous liquid, particularly hydrocarbonaceous liquids derived from at least one of oil shale, coal, tar, tar sands, pitch, and the like. A suitable liquid has a boiling range within the range of from the boiling point of butane to at least about 1500° F. A particularly suitable hydrocarbonaceous liquid for use as a displacement liquid is that derived from the hydrogenation of normally solid coal to liquify same and having a boiling range of from about 600 to about 1000° F.

The solids containing liquid and displacement liquid when charged to chamber 1 and these liquids when in place in chamber 1 can be at sub-ambient, ambient, or super-ambient conditions of temperature and pressure and under an air atmosphere as desired and necessary to meet the requirements of operation for the process of this invention.

Generally, in the operation of the apparatus of the drawing, the solids containing liquid and the displacement liquid are adjusted so that the displacement liquid has a higher specific gravity by varying the temperautre of the two liquids. For example, a solids containing hydrocarbonaceous liquid having materials in the boiling range from the boiling point of 450 to about 1500° F. can be charged by way of pipe 3 and maintained in chamber 1 at a temperature of at least about 650° F. The displacement liquid can be an aqueous liquid or a hydrocarbonaceous liquid which is charged by way of pipe 8 and which is maintained in chamber 1 at a temperature no greater than about 200° F. The temperature differentials between the two liquids provide the displacement liquid with the specific gravity which is 0.10 specific gravity units greater than the specific gravity of the solids containing hydrocarbonaceous liquid.

In the operation of the apparatus of the drawing in accordance with this invention, the solids containing hydrocarbonaceous liquid is preferably derived from the hydrogenation of normally solid coal to liquify same and has a boiling range which starts at about 700° F., this liquid being maintained in chamber 1 at a temperature of at least about 650° F. while the displacement liquid is a hydrocarbonaceous liquid derived from the hydrogenation of normally solid coal to liquify same and has a boiling range of from about 500 to about 900° F. and is maintained at a temperature no greater than about 200° F. in chamber 1.

The pressure in chamber 1 should be of sufficient magnitude based on the temperature and liquid compositions in chamber 1, to prevent substantial vaporization or boiling of at least the solids containing liquid, preferably both the solids containing liquid and the displacement liquid, thereby insuring the maintenance of a substantially quiescent interface between the two liquids. Generally, a pressure sufficient to prevent substantial vaporization of only the solids containing liquid is necessary because the flow rate of the displacement liquid can prevent heating of that liquid while in chamber 1 to the point of substantial vaporization or to the temperature of the solids containing liquid in chamber 1. However, if the flow rate of the displacement liquid was to be substantially reduced or stopped, it is preferable that the pressure in chamber 1 be sufficient to prevent substantial vaporization of the displacement liquid remaining in chamber 1. Examples of suitable minimum pressures for various liquids and temperatures are as follows:

TABLE 1

| Solids containing liquid coal derived hydrocarbonaceous oil | Displacement liquid | Minimum pressure, p.s.i.g. |
| --- | --- | --- |
| 125° F.+boiling range liquid at 650° F. | Water, aqueous solutions, or aqueous suspensions at 100 to 250° F. | 2,300 |
| 125° F.+boiling range liquid at 400° F. | -----do----- | 450 |
| 300° F.+boiling range liquid at 400° F. | -----do----- | 45 |
| 500° F.+boiling range liquid at 250° F. | -----do----- | 20 |
| 500° F.+boiling range | -----do----- | 2,300 |
| Do | 500–850° F. boiling range coal derived hydrocarbonaceous oil at 100° F. | 55 |
| 650° F.+boiling range liquid at 650° F. | 650–850° F. boiling range coal derived hydrocarbonaceous oil at 100° F. | 5 |
| 125° F.+boiling range liquid at 650° F. | 500–850° F. boiling range coal derived hydrocarbonaceous oil at 100° F. | 1,200 |

The flow rate of the displacement liquid through chamber 1 is of sufficient magnitude so that the displacement liquid has a specific gravity difference from the solids containing liquid of at least 0.05, notwithstanding the temperature rise of the displacement liquid while in chamber 1 in contact with the hotter solids containing liquid and taking in the hot solids from the solids containing liquid. Thus, the flow rate is sufficient to keep from heating the displacement liquid to the point where the difference in specific gravity between the two liquids is less than 0.05 specific gravity units. This flow rate will generally be at least about 0.5 gallon/hour (gal./hr.) per 1 square foot of interface. Examples of suitable minimum flow rates for various liquids and temperatures are as follows:

TABLE 2

| Solids containing liquid | Displacement liquid | Interface area, sq. ft. | Minimum flow of displacement liquid, gal./hr. |
| --- | --- | --- | --- |
| 10 gal./hr. of hydrocarbonaceous oil at 650° F., sp. gr. 0.862, and containing 12 wt. percent solids. | Water at 100° F. | 0.25 | 1.5 |
| Do. | ---do--- | 1 | 4.2 |
| 10 gal./hr. of hydrocarbonaceous oil at 300° F., sp. gr. 1.16, and containing 10 wt. percent solids. | Aqueous solution of 30 wt. percent aluminum chloride at 80° F., sp. gr. 1.242. | 0.5 | 1.4 |
| 10 gal./hr. of hydrocarbonaceous oil at 650° F., sp. gr. 0.943, and containing 12 wt. percent solids. | 500–850° F. boiling range coal derived hydrocarbonaceous oil at 100° F., sp. gr. 1.04. | 0.25 | 5.0 |

If desired, a third liquid can be interspersed as a sandwich layer between the solids containing liquid and the displacement liquid so that if any extraneous liquid is carried forward with the displacement liquid it will be the intermediate liquid and not the solid containing liquid. The intermediate liquid can be tailored to also be more easily removable from the solids than the solids containing liquid so that all liquid removed with the solids will be either easily removable displacement liquid or easily removable intermediate liquid. The intermediate liquid should meet the requirements set forth hereinabove with regard to the displacement liquid and its specific gravity can be adjusted in a way obvious in the art as well as disclosed hereinabove so that it is intermediate the heavier displacement liquid and the lighter solids containing liquid. Here also the intermediate liquid can be aqueous or hydrocarbonaceous. The above discussion concerning operating temperatures, pressures, flow rates, and the like also applies when a third liquid is used.

Generally in the liquifaction of solid coal, the product is a mixture of gas and liquid which is passed to a high pressure flash drum (separator). This is shown in FIG. 1 of said U.S. Pat. Re. 25,770, where the product of the ebullated bed hydrogenation reactor 5 passes by way of pipes 10 and 11 to high pressure separator 12. The solids separation apparatus for carrying out the method of this invention can be incorporated in the bottom of a separator such as separator 12 thereby avoiding the necessity of a separate and additional high pressure vessel to practice the method of this invention. In the liquifaction of coal with hydrogenation in an ebullated bed, the product effluent from the ebullated bed is routinely at a temperature and pressure (about 650° F. and 2250 p.s.i.g.) which allows the incorporation of the apparatus for the method of this invention in the bottom of the conventional high pressure separator, such as separator 12, and the use of water or aqueous solutions or dispersions as the displacement liquid.

Apparatus other than that shown in the drawing can be employed for this invention as will be obvious to one skilled in the art. For example, when the displacement liquid is a hydrocarbonaceous material filters and/or hydroclones can be used instead of the apparatus of FIG. 1. When the displacement liquid is aqueous in nature filters and/or hydroclones can be used, but separation of the solids can also be effected by settling or drainage. For example, the slurry of solids and displacement liquid can be dumped into a tank or an earthen settling pond, the solids allowed to settle to the bottom and the aqueous upper layer removed for reuse as displacement liquid.

EXAMPLE I

The process of this invention is carried out in the apparatus as shown in the drawing wherein the solids containing liquid is a complex hydrocarbonaceous liquid obtained by the hydrogenation of Illinois No. 6 coal subdivided to all pass a 20 mesh sieve (Tyler), the hydrogenation being accomplished with molecular hydrogen at a temperature of about 850° F. and a hydrogenation partial pressure of about 2250 p.s.i.a.

After flashing the light distillate oils from the hydrogenation product the residual liquid hydrocarbonaceous product obtained from the hydrogenation process has a boiling range starting from about 600° F. and has about 50 percent boiling above 1000° F. and contains about 12 weight percent of particles composed primarily of cobalt molybdate hydrogenation catalyst particles, unconverted coal particles, ash, coke, and char, the particles having a largest cross-sectional dimension of from about 1 micron to about 50 microns.

The solids containing liquid is passed into chamber 1 and maintained therein with substantially no mixing thereof at a temperature of about 650° F., which temperature gives the liquid a specific gravity of 0.943. Displacement liquid which is a 500° to 850° F. oil product of the coal hydrogenation at 100° F. and a specific gravity at that temperature of 1.04 is introduced into localized portion 5 at the rate of 5 gallons per minute.

Solids containing displacement liquid is removed from localized portion 5 by way of pipe 10 at the rate of 5.6 gallons per minute and contains 17 weight percent of solid particles as defined hereinabove in this example and 83 weight percent hydrocarbonaceous liquid, both weight percents being based on the total weight of the displacement liquid.

Substantially solids free hydrocarbonaceous liquid, i.e., having less than 0.02 weight percent solid particles based on the total weight of the liquid, is removed by way of pipe 6 at the rate of 9.4 gallons per minute. Solids containing hydrocarbonaceous liquid is charged by way of pipe 3 at the rate of 10 gallons per minute. The charging rate of liquid from pipes 3 and 8 is sufficient to prevent turbulence or substantial stirring of any of the liquid in chamber 1.

EXAMPLE II

The total liquid product from the coal hydrogenation of Example I, having a boiling range starting about 15° F. and having about 42 weight percent boiling above 1000° F. and containing about 10 weight percent of particles of the type described in Example I, is passed into chamber 1 and maintained therein with substantially no mixing thereof at a temperature of about 150° F. This temperature gives the liquid a specific gravity of 1.15.

Displacement liquid which is an aqueous solution of aluminum chloride containing 35 percent aluminum chloride by weight, is introduced into localized portion 5 at a temperature of 80° F. The displacement liquid has a specific gravity of 1.28 at this temperature.

The solids containing liquid is charged to chamber 1 at a rate of 11.1 gallons per minute and the displacement liquid is introduced into localized portion 5 at a rate of 1 gallon per minute.

Solids containing displacement liquid is removed from localized portion 5 by way of pipe 10 at the rate of 1.4 gallons per minute and contains 50 weight percent of solid particles as defined in Example I and 50 weight percent aqueous aluminum chloride solution, both weights being based on the total weight of the displacement liquid.

Substantailly solids free hydrocarbonaceous liquid, i.e., having less than 0.02 weight percent solid particles based on the total weight of the liquid, is removed by way of pipe 6 at the rate of 10.7 gallons per minute.

EXAMPLE III

A sub-bituminous coal containing 21.5 weight percent water and 9.1 weight percent ash, dry basis, and having a heating value of 8,900 B.t.u./pound is hydrogenated in the manner of Example I. The total liquid product having a boiling range starting about 125° F. and having about 25 weight percent boiling above 1000° F. and contains 12 weight percent solids of the type described in Example I is passed into chamber 1 and maintained therein with substantially no mixing thereof at a temperature of about 640° F. and a pressurt of 2250 p.s.i.g. At these conditions the liquid has a specific gravity of 0.862.

Displacement liquid which is water at 220° F. and 2250 p.s.i.g. is introduced into localized portion 5. The water has a specific gravity of 0.955 at these conditions. The solids containing liquid is charged to chamber 1 at 10 gallons per minute and the displacement liquid is introduced into localized portion 5 at a rate of 3.2 gallons per minute.

Solids containing displacement liquid is removed from localized portion 5 by way of pipe 10 at a rate of 3.8 gallons per minute and contains about 25 weight percent of solid particles as defined in Example I and about 75 weight percent of water, both weights being based on the total weight of the displacement liquid. The solids containing displacement liquid is passed through a heat exchanger where about 6500 B.t.u per gallon is added to the liquid.

The pressure of the solids containing displacement liquid is then reduced to atmospheric pressure and the stream is flashed into a chamber where the water vaporizes and the solids drop to the bottom of the chamber from which they are periodically removed. The vaporized water passes overhead from the chamber, is condensed, and is reused in the process.

Substantially solids free hydrocarbonaceous liquid, i.e., having less tan 0.02 weight percent solid particles based on the total weight of the liquid, is removed from chamber 1 by way of pipe 6 at the rate of 9.4 gallons per minute.

Reasonable variations and modifications are possible within the scope of this disclosure without departing from the spirit and scope of this invention.

The embodiments of the invention in which an exclusive property or privilege is claimed are defined as follows:

1. A method for separating solid particles from a hydrocarbonaceous liquid in which they are dispersed comprising injecting said solids containing liquid into a baffle free zone, subjecting said solids containing liquid to force conditions in said baffle free zone which cause said solid particles to collect in a localized portion of the liquid, introducing into said localized portion a displacement liquid which is substantially inert to said solids containing liquid and which has a specific gravity which is substantailly greater than said solids containing liquid so that said displacement liquid takes the place of at least part of the solids containing liquid in said localized portion and forms a substantially constant level interface between said solids containing liquid and said displacement liquid, and takes up the solid particles migrating into said localized portion, said displacement liquid being introduced substantially at the interface between said localized portion of liquid and said displacement liquid, removing substantially solids free hydrocarbonaceous liquid, and separately removing displacement liquid having dispersed therein solid particles taken from said solids containing hydrocarbonaceous liquid.

2. A method according to claim 1 wherein said force conditions are at least in part from gravity.

3. A method according to claim 1 wherein said displacement liquid has a specific gravity at least 0.05 specific gravity units greater than the specific gravity of said hydrocarbonaceous liquid.

4. A method according to claim 1 wherein said displacement liquid is maintained in contact with said hydrocarbonaceous liquid for a time sufficient for substantial amounts of solid particles to migrate from said hydrocarbonaceous liquid into said displacement liquid under the prevailing force conditions.

5. A method according to claim 1 wherein said displacement liquid is one of an aqueous liquid or a hydrocarbonaceous liquid which is compatible with said solids containing hydrocarbonaceous liquid.

6. A method according to claim 1 wherein said force conditions are at least in part from centrifugal force.

7. A method according to claim 1 wherein said force conditions are at least in part from electrical force.

8. A method according to claim 5 wherein said solids containing hydrocarbonaceous liquid is obtained from the hydrogenation of coal, and said displacement liquid is obtained from the hydrogenation of coal.

9. A method according to claim 1 wherein said force conditions comprise forming a pool of said solids containing hydrocarbonaceous liquid, maintaining said pool in a substantially quiescent state so that solid particles migrate to the bottom of the pool under the force of gravity.

10. A method according to claim 9 wherein the liquid part of said solids containing hydrocarbonaceous liquid is derived from the hydrogenation of normally solid coal to liquefy same and has a boiling range which starts at about 500° F., said solids containing liquid is maintained at a temperature of at least about 450° F. in said pool, said displacement liquid is a hydrocarbonaceous liquid derived from the hydrogenation of normally solid coal to liquefy same and has a boiling range of from about 400° F. to about 900° F., said displacement liquid is introduced near the bottom of said pool at a temperature of no greater than about 150° F. and at a rate which prevents substantial turbulence at the interface between the solids containing liquid and the displacement liquid and which prevents heating of the displacement liquid to the point where the difference in specific gravity between the two liquids is less tan 0.05 specific gravity units, the pressure on said pool being sufficient to prevent substantial vaporization of at least the solids containing liquid, solids containing displacement liquid is removed from the bottom of said pool at a rate about equal to the rate of introduction of displacement liquid and solids free hydrocarbonaceous liquid is removed from near the top of said pool.

11. A method according to claim 9 wherein said displacement liquid is aqueous.

12. A method according to claim 9 wherein said displacement liquid consists esssentially of an aqueous solution at a temperature at which the solution has a specific gravity at least 0.05 specific gravity units greater than the specific gravity of the solids containing hydrocarbonaceous liquid.

13. A method according to claim 1 wherein said force conditions are at least in part from magnetic force.

References Cited

UNITED STATES PATENTS

| | | | |
|---|---|---|---|
| Re. 25,770 | 6/1961 | Johanson | 208—10 |
| 3,196,141 | 7/1965 | Beadford | 210—83 |

James L. DE CESARE, Primary Examiner

U.S. Cl. X.R.

210—83, 511

PO-1050
(5/69)

UNITED STATES PATENT OFFICE
CERTIFICATE OF CORRECTION

Patent No. 3,661,774      Dated May 9, 1972

Inventor(s) George P. Masologites

It is certified that error appears in the above-identified patent and that said Letters Patent are hereby corrected as shown below:

Column 4, line 8, "this particles" should read ---the particles---.

Column 5, line 6, delete "temperautre" and insert therefor ---temperature---.

Column 5, line 53, after "liquid" insert ---,---.

Column 5, line 61, after "500°F+ boiling range" insert ---liquid at 650°F.---.

Column 7, line 48, delete "15°" and insert therefor ---125°---.

Column 8, line 12, delete "pressurt" and insert therefor ---pressure---.

Column 8, line 37, delete "tan" and insert therefor ---than---.

Column 10, line 7, delete "tan" and insert therefor ---than---.

Signed and sealed this 1st day of August 1972.

(SEAL)
Attest:

EDWARD M. FLETCHER, JR.
Attesting Officer

ROBERT GOTTSCHALK
Commissioner of Patents